Figure 1:
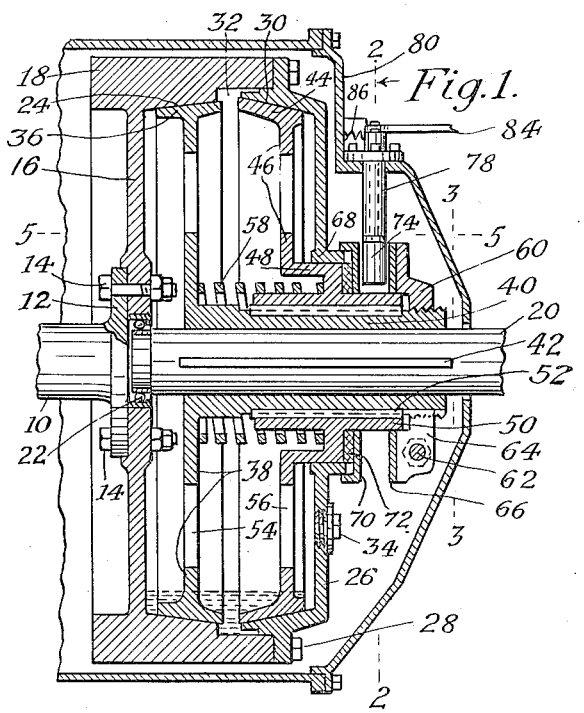

G. T. STRITE.
CLUTCH.
APPLICATION FILED MAY 8, 1918.

1,299,258.

Patented Apr. 1, 1919.

Inventor:
George T. Strite
By Whiteley and Ruckman
his Attorneys.

UNITED STATES PATENT OFFICE.

GEORGE T. STRITE, OF MINNEAPOLIS, MINNESOTA.

CLUTCH.

1,299,258. Specification of Letters Patent. Patented Apr. 1, 1919.

Application filed May 8, 1918. Serial No. 233,264.

*To all whom it may concern:*

Be it known that I, GEORGE T. STRITE, a citizen of the United States, residing at Minneapolis, in the county of Hennepin and State of Minnesota, have invented certain new and useful Improvements in Clutches, of which the following is a specification.

My invention relates to clutches and the object is to provide a device of this kind which shall be simple and durable in construction, efficient and self-adjusting in operation and in which there is no end thrust at any time.

The full objects and advantages of my invention will appear in connection with the detailed description thereof and are particularly pointed out in the claims.

Referring to the drawings, which illustrate the application of my invention in one form,—

Figure 2:
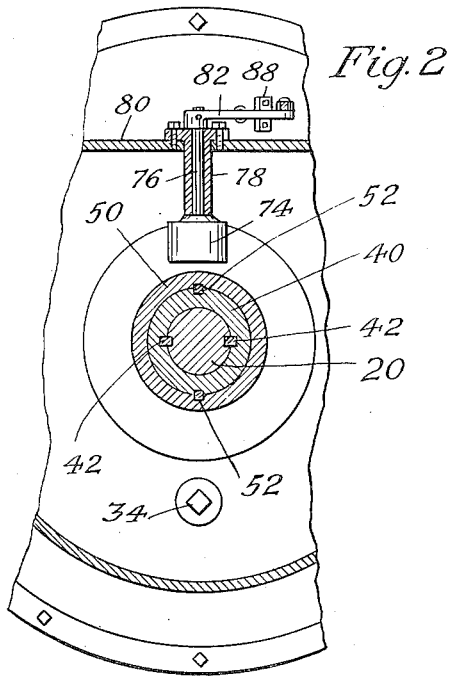
Figure 4:
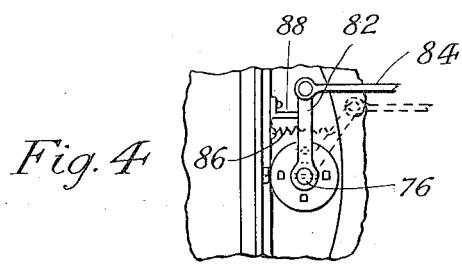
Figure 5:
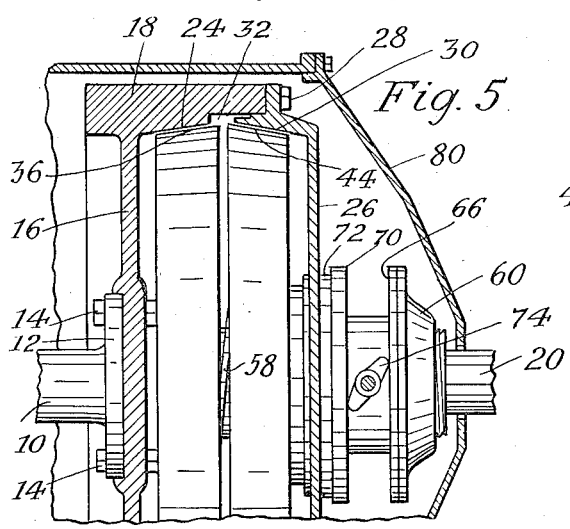
Figure 3:
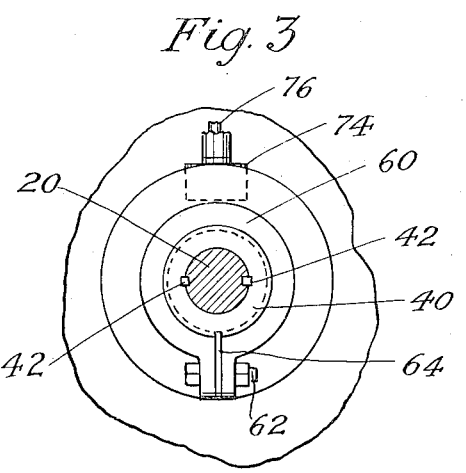

Figure 1 is a view in central longitudinal section showing the clutch in engaged position. Fig. 2 is a section on the line 2—2 of Fig. 1. Fig. 3 is a section on the line 3—3 of Fig. 1. Fig 4 is a plan view of the clutch-operating mechanism. Fig. 5 is a section on the line 5—5 of Fig. 1, but showing the clutch in disengaged position.

While my clutch may be used in various mechanisms, it is intended for use in tractors particularly. For this reason I have shown it in connection with an engine shaft 10 having a flange 12 on its outer end to which is secured by bolts 14 an annular member 16 on the periphery of which is a fly-wheel 18. A driven shaft 20 has one of its ends adjacent the outer end of the driving shaft 10 and supported by a ball bearing constituted by balls 22 located between a raceway on the end of the driven shaft and a raceway on the inner circumference of the annular member 16. The fly-wheel is provided with an internal coned surface 24 and an annular member 26 is secured by bolts 28 to the outer edge of the fly-wheel. The annular member is offset to provide a coned surface 30 which is opposed to the coned surface 24 so that the fly-wheel is in this manner provided with two coned surfaces having their bases adjacent but separated by a gap 32. The annular members 16 and 26, together with the fly-wheel, form a chamber which may be supplied with oil from time to time by unscrewing a plug 34 which is designed to fit a screw-threaded opening in the member 26. A clutch member is provided with a coned flange 36 to coöperate with the coned surface 24, and this flange is connected by an annular member 38 to a sleeve 40 splined on the shaft 20 by splines 42. Another clutch member is provided with a coned flange 44 to coöperate with the coned surface 30, and this flange is connected by an annular member 46 having an offset portion 48 to a sleeve 50 splined on the sleeve 40 by splines 52. The annular members 38 and 46 are provided with openings 54 and 56, respectively, to permit free movement of oil in the chamber; and the two members are normally urged apart by a stiff helical spring 58 positioned between them and surrounding the sleeves 40 and 50. It is obvious that this spring when allowed to act will bring the two sets of coned surfaces into firm engaging position. In order to bring the clutch members out of clutched position the following clutch-operating mechanism is provided. The outer end of the sleeve 40 is screw-threaded to receive a screw-threaded split ring 60 which may be locked in place by a bolt 62 passing through offset ends of the split ring and a locking plate 64, the end of which extends into a longitudinal groove in the screw threads on the sleeve. A washer 66 inside of the ring 60 surrounds the sleeve 50. The annular member 26 is provided with a flange 68 fitting upon the offset portion 48. Also surrounding the sleeve 50 is a washer 70 adjacent the end of the offset portion and separated therefrom by a fiber washer 72. Located between the two washers 66 and 70 is a double cam 74 secured to the end of a rotatable rod 76 which is mounted in a tubular bearing 78 bolted to the housing 80 which entirely surrounds the clutch. To the upper end of the rod 76 is secured an arm 82 to which is pivotally connected an operating rod 84. A spring 86 secured to the housing and to the arm normally holds the latter against a stop 88 on the housing. When the rod 84 is drawn into the dotted position shown in Fig. 4, the cam 74 is turned into the position shown in Fig. 5, and the cam forces the sleeve 40 and its attached clutching member to the right, as viewed in Fig. 1, and at the same time forces the sleeve 50 and its attached clutching member to the left, thereby causing complete unclutching action in opposition to the tension of the spring 58.

The operation and advantages of my invention will be obvious from the foregoing description. A double-coned clutch is provided which has an exceedingly large friction clutching surface, and since the clutch is in all respects self-adjusting no adjustment whatever by the operator is necessary. A closed chamber is provided for containing oil sufficient for lubricating the parts without renewal except at long intervals of time, and the clutch is entirely inclosed so as to be dustproof. Wear is, therefore, reduced to a minimum and a structure is provided in which there is no end thrust at any time.

I claim:

1. A clutch comprising a driving shaft, a clutch member secured thereto having two coned surfaces, two clutch members coöperating with said first mentioned clutch member, a driven shaft upon which said coöperating clutch members are non-rotatably and slidably mounted, a spring interposed between said coöperating clutch members for normally holding the clutch members in engagement, opposed annular members connected respectively to said coöperating clutch members and forming an annular groove, a housing surrounding all of the clutch members, a rod rotatably mounted in said housing, and means secured to the end of said rod and positioned in said annular groove to cause the coöperating clutch members to approach each other in opposition to the tension of said spring when said rod is turned.

2. A clutch comprising a driving shaft, a clutch member secured thereto having two coned surfaces, a driven shaft, a sleeve splined on said driven shaft, a clutch member mounted on said sleeve for coöperation with one of said cone surfaces, a second sleeve splined on said first mentioned sleeve, a clutch member mounted on said second sleeve for coöperation with the other of said cone surfaces, a helical spring surrounding said sleeves and normally holding the clutch members in engagement, opposed annular members on said sleeves forming an annular groove, a housing surrounding all of the clutch members, a rod rotatably mounted in said housing, and means secured to the end of said rod and positioned in said annular groove to cause the splined clutch members to approach each other in opposition to the tension of said spring when said rod is turned.

In testimony whereof I hereunto affix my signature.

GEORGE T. STRITE.